United States Patent Office 3,300,442
Patented Jan. 24, 1967

3,300,442
METAL PHOSPHITE AND BENZOPHENONE STABILIZED RESIN COMPOSITION
Joseph R. Darby, Webster Groves, and Paul R. Graham, Richmond Heights, Mo., assignors to Monsanto Company, a corporation of Delaware
No Drawing. Filed Jan. 17, 1963, Ser. No. 252,044
5 Claims. (Cl. 260—45.75)

This application is a continuation-in-part of application Serial Number 729,555, filed April 21, 1958, now abandoned.

This invention relates to new and useful halogen-containing resin compositions which are more resistant to deterioration under the influence of heat and light than those heretofore produced.

Halogen-containing resins are notoriously unstable upon exposure to heat and ultraviolet light. This instability is evidenced by the rapid discoloration and serious stiffening apparent after exposure to processing temperatures and/or outdoor weathering. Moreover, this instability is sometimes aggravated by the presence of plasticizers and other additives which are themselves prone to degradation. It is imperative then for the successful use of these halogen-containing resin compositions, that the formulations contain additives capable of preventing this discoloration and loss of physical properties which occurs during processing and/or exposure to outdoor conditions, particularly ultraviolet light effects.

Accordingly, it is an object of this invention to provide halogen-containing resin compositions which have improved light stability. Other objects will become apparent from the following description of the invention.

In accordance with this invention it has been found that the light stability properties of halogen-containing resins are substantially improved by incorporating therein a 2-hydroxybenzophenone and a basic metal phosphite. These materials are added in the proportions of 0.01 to 10 parts by weight of 2-hydroxybenzophenone per 100 parts by weight of halogen-containing resin and 0.1 to 10 parts by weight of metal phosphite per 100 parts by weight of said resin. More preferably the proportions of 2-hydroxybenzophenone are 0.5 to 5 parts and of basic metal phosphite are 2.0 to 5.0 parts. The composition thus obtained not only possesses a high resistance to heat (i.e. the processing temperatures normally incurred in preparing halogen-containing resin compositions) but also unusual stability to the effects of ultraviolet light.

It should be noted that while the additives of this invention have per se a stabilizing effect upon halogen-containing resins, the light stabilizing effect produced is not simply the additive effect of the two compounds, since the results obtained are greater than would be expected from the use of either a 2-hydroxybenzophenone or a basic metal phosphite alone. As will be evident from the data provided below, there is a very definite synergistic action in that the stabilizing result obtained from the use of both is materially greater than the sum of the individual stabilizing action of each.

The following examples are illustrative of this invention but in no manner are to be construed as limitative thereof.

Compositions comprising, respectively

|  | A | B | C | D | E |
|---|---|---|---|---|---|
| Polyvinylchloride | 100 | 100 | 100 | 100 | 100 |
| Di(2-ethylhexyl)phthalate | 25 | 25 | 25 | 25 | 25 |
| Butylbenzyl phthalate | 25 | 25 | 25 | 25 | 25 |
| Dibasic lead phosphite |  |  | 3 |  | 3 |
| Lead Stearate |  | 0.5 | 0.5 | 0.5 | 0.5 |
| Lead Silicate |  | 3 |  | 3 |  |
| 2-hydroxy-4-methoxybenzophenone |  |  |  | 2 | 2 | are prepared by mixing polyvinyl chloride with the respective ingredients in amounts set forth above on differential speed rolls at a roll temperature of 160° C. to form a homogeneous composition which is removed from the roll in crude sheets. From the milled composition, finished sheets are molded which are about 0.040 inch in thickness employing a molding cycle of three minutes at 160° C.

The light stability values set forth below are obtained after weatherometer exposure for the stated number of hours:

| Hours | A | B | C | D | E* |
|---|---|---|---|---|---|
| 500 | Dark red | Red | Red specks | Yellow | Colorless. |
| 1,000 | do | Dark red | Red | Many red specks | Do. |
| 2,400 | do | do | Dark red | Red | Do. |
| 3,000 | do | do | do | do | Do. |

*The remarkable color stability of this composition is still evident after 4,500 hours exposure.

Since a given formulation could appear to be visually "stable" but fail in use because of mechanical property loss, ultimate elongation tests were made on the specimens at various exposure times. The elongation values set forth below are obtained after weatherometer exposure for the stated number of hours:

| Hours | Elongation (percent) | | | | |
|---|---|---|---|---|---|
|  | A | B | C | D | E* |
| 500 | 165 | 0 | 275 | 290 | 320 |
| 1,000 | 20 | 0 | 100 | 200 | 320 |
| 2,400 | 0 | 0 | 0 | 0 | 300 |
| 3,000 | 0 | 0 | 0 | 0 | 260 |

*The remarkable physical stability of this formulation is still evident after 4,500 hours of exposure, in that the elongation value of the specimen is 175%.

Compositions having similarly improved light stability properties are prepared by replacing the dibasic lead orthophosphite component of composition E with substantially the same amount, respectively of monobasic lead orthophosphite, dibasic cadmium orthophosphite, and monobasic cadimum orthophosphite.

Compositions having similarly improved light stability properties are prepared by replacing the 2-hydroxy-4-methoxybenzophenone, with an equal weight of 2-hydroxybenzophenone, 2,4-dihydroxybenzophenone, 2-hydroxy - 5-chlorobenzophenone, 2-hydroxy-5-methlybenzophenone, 2-hydroxy-4,4′-dimethoxybenzophenone, 2,2′-dihydroxybenzophenone, 2,4,4′-trihydroxybenzophenone, 2-hydroxy - 4-octyloxybenzophenone and 2-hydroxy-4-decyloxybenzophenone.

Results similar to that obtained with composition E are obtained when the polyvinyl chloride component of this composition is replaced by an equivalent amount of the following resins: copolymer of 95 parts of vinyl chloride and 5 parts of vinyl acetate, copolymer of 90 parts vinyl chloride and 10 parts of vinylidene chloride, copolymer of 85 parts of vinyl chloride and 15 parts of diethyl maleate, chlorinated polyvinyl acetate, chlorinated polyvinyl chloride and polyvinylidene chloride.

Results similar to that obtained with composition E are also obtained when the plasticizer component of said composition (mixture of di-2-ethylhexyl phthalate and butyl-benzyl phthalate) is replaced by an equivalent amount of 2-ethylhexyl diphenyl phosphate, tricresyl phosphate, trixylyl phosphate, di(butoxyethyl) phthalate, di-isodecyl phthalate, butyl glycidyl phthalate and a polyester type plasticizer, specifically the reaction product of 1,2-propylene glycol and adipic acid (MW 2000–3000).

A National X–1A weatherometer was used in the above tests. It was operated essentially according to ASTM method D–822–46T. Test specimens were attached to a rotary rack which made a complete revolution around the carbon electrode every two hours. Water sprays operated continuously and each specimen was exposed to the area of direct spray for about 18 minutes during each revolution of the rack. At regular intervals, small segments were cut from the exposed specimens and mounted on white charts such that a profile of the color degradation which occurred as the time elapsed, is visibly evident. The profile charts were not assessed immediately after attaching the exposed specimens because color degradation is not always evident at this time. Instead, the charts were stored overnight in the dark so that any latent degradation that took place with the specimen would have time to become visible.

A model TCC Instron Tester was used to measure the physical properties of the specimens. A small die was constructed for this test, since the specimens used were comparatively small themselves. The dumbbell shaped die had an overall length of 2″, and ends ¾″ in width and the center section was ½″ long and 0.05″ wide. The use of this die was found to be very valuable for following the abrupt changes in the mechanical behavior of the film after exposure to heat and light. The crosshead was maintained at 10 in./min. and the full scale load was set at 2 lbs. for the 0.004 in. film, and the full scale load was set at 10 lbs. for the 0.04 in. films.

2-hydroxy benzophenones in general are useful in the compositions of this invention. 2-hydroxy benzophenones of the following structure have been found to be particularly satisfactory

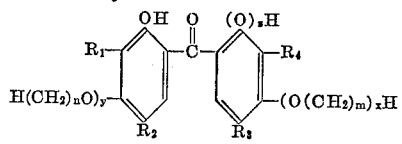

wherein $x$, $y$ and $z$ are integers of from 0 to 1, $m$ and $n$ are integers of from 0 to 10 and $R_1$, $R_2$, $R_3$ and $R_4$ are each selected from the group consisting of hydrogen, halogen and lower alkyl radicals, e.g. methyl, ethyl, isopropyl, n-propyl, n-butyl, etc. As illustrative of compounds which come within the above structure and definition there may be mentioned; 2-hydroxy-benzophenone, 2-hydroxy-4-methoxybenzophenone, 2-hydroxy-4,4′-methoxybenzophenone, 2-hydroxy-4-ethoxybenzophenone, 2-hydroxy - 4-propoxy-4′ - ethoxybenzophenone, 2-hydroxy-3,5 - dimethylbenzophenone, 2-hydroxy-3′,5′-dichlorobenzophenone, 2,4,4′-trihydroxybenzophenone, 2-hydroxy-5-chlorobenzophenone, 2 - hydroxy-3-bromobenzophenone, 2-hydroxy-3-chloro-5-methylbenzophenone, 2-hydroxy-4-octyloxybenzophenone, 2-hydroxy-4 - decyloxybenzophenone, etc. It is preferred that the R radicals be hydrogen in the above structure and particularly preferred that $m$ and/or $n$ be 0 or 1 and $z$ be zero.

The basic metal phosphites which are useful in the compositions of this invention are double salts in which the metal is selected from the group consisting of lead and cadmium and contain the radicals OH (hydroxide) or O (oxide) in their structure. Basic metal phosphites in which the phosphorus atom is in an oxidation state lower than five are within the broad scope of this invention. Thus, basic metal phosphites prepared from phosphorus acid (i.e. ortho-phosphorous acid, $H_3PO_3$), hypophosphorous acid, metaphosphorous acid, and pyrophosphorous acid are useful in the compositions and methods of this invention.

Basic metal phosphites prepared from orthophosphorous acid are preferred. As illustrative of such compounds there may be named dibasic lead orthophosphite ($2PbO.PbHPO_3.\frac{1}{2}H_2O$), dibasic cadmium orthophosphite ($2CdO.CdHPO_3.H_2O$), monobasic cadmium orthophosphite ($CdO.HPO_3.H_2O$) and monobasic lead orthophosphite ($PbO.HPO_3.H_2O$). Dibasic lead orthophosphite is especially preferred.

These compounds may be prepared by numerous methods known to those skilled in the art. For example, the ortho-phosphites may be prepared by reacting a halide of the appropriate metal with orthophosphorous acid or with a compound which yields ortho-phosphorous acid on hydrolysis, e.g. ortho-phosphite monoesters, diesters, etc. The pH of the reaction mixture is raised with an appropriate base, e.g. NaOH, to precipitate the salt and the basic metal ortho-phosphite is recovered by filtering the reaction mixture and drying the filter cake.

Since these complex salts are coordination compounds, e.g. dibasic lead orthophosphite has the structure

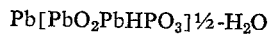

then it is possible to replace the cationic lead with any metal ion by a simple interchange reaction, i.e. reaction with a salt of another metal. These complex salts which contain the desired metal in the anionic portion of the molecule are also useful in the compositions of this invention.

Thus, the phrase "basic metal phosphite in which the metal is selected from the group consisting of lead and cadmium" as used herein shall be understood to refer to a metal salt of a phosphorus-containing acid in which the phosphorus atom is in an oxidation state lower than five, the metal in the anionic portion of the molecule is a metal selected from the group consisting of lead and cadmium and the radicals OH (hydroxide) or O (oxide) are present in the structure.

As indicated above it is found that surprisingly effective stabilizing results are obtained according to this invention with halogen-containing resins generally, numerous examples of which are well known to those skilled in the art. Thus, there may be employed resins prepared from such vinylidene compounds as vinyl chloride, vinylidene chloride, vinyl chloroacetate, chlorostyrenes, chlorobutadienes, etc. Such vinylidene compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene paraethyl styrene, divinyl benzene, vinyl naphthalene, alpha-methyl styrene; dienes, such as butadiene, unsaturated amides, such as acrylic acid amide, acrylic acid aniline; unsaturated nitriles, such as acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids, and the like. The class of copolymers in which a predominant portion, i.e., more than 50% by weight, of the copolymer is made from a halogen-containing vinylidene compound such as vinyl chloride represents a preferred class of polymers to be treated accordinng to the invention.

Among the preferred embodiments of the invention is the stabilization of polymers prepared by the copolymerization of 95 to 80 parts by weight of a vinyl halide, e.g. vinyl chloride with 5 to 20 parts by weight of an α,β-unsaturated polycarboxylic acid such as diethyl maleate or other esters of maleic, fumaric, aconitic, itaconic acids, etc. Among the preferred esters of such acids are alkyl esters in which the alkyl group contains not over 8 carbon atoms.

The light stabilizer mixture of the invention is also effective when intimately mixed with halogen-containing resins in which part or all of the halogen is introduced into a preformed resin, e.g. chlorinated polyvinyl acetate, chlorinated polystyrene, chlorinated polyvinyl chloride, chlorinated natural and synthetic rubbers, rubber hydrochloride, etc.

The light stabilizer mixture of the invention is also effective in halogen-containing resins containing halogens other than chlorine, e.g. bromine, fluorine and iodine.

The halogen-containing resins may contain a varying proportion of halogen depending upon the nature of the resin and its contemplated use. However, as indicated above, vinyl chloride polymers in which the proportion of vinyl chloride units amount to 50% or more of the total monomer used in making the polymeric product represents a preferred class of polymers to be heat and light stabilized according to the invention.

Of course, it is to be understood that the light stabilizer mixture of this invention is applicable to compositions containing other plasticizers than the specific ones mentioned above. Thusly, halogen-containing resin compositions which are plasticized with any vinyl plasticizers are also effectively light stabilized by the mixture of this invention. In the case of certain halogen-containing resins no plasticizers are required, these resins are also effectively stabilized with the light stabilizer combination of this invention, as is PVC in those applications where plasticizers are required.

In addition to the stabilizer combination of this invention, other heat and light stabilizers may be included if desired, examples of which are well known to those skilled in the art as well as conventional additives such as other resins, lubricants, coloring materials, fillers, etc.

While this invention has been described with respect to certain embodiments, it is not so limited and it is to be understood that variations and modifications thereof may be made without departing from the spirit or scope of this invention.

What is claimed is:

1. A light stabilized polymer composition comprising polyvinyl chloride, from 0.01 to 10 parts by weight per 100 parts by weight of said polymer of 2-hydroxy-4-methoxybenzophenone and from 0.1 to 10 parts by weight per 100 parts by weight of said polymer of a basic metal phosphite in which the metal is selected from the group consisting of lead and cadmium.

2. A composition of claim 1 in which the metal phosphite is dibasic lead orthophosphite.

3. A composition of claim 1 in which the metal phosphite is dibasic cadmium orthophosphite.

4. A composition of claim 1 in which the polymer composition contains from about 2.0 to 5.0 parts by weight of phosphite and 0.5 to 5 parts by weight of 2-hydroxy-4-methoxybenzophenone.

5. A light stabilized polymer composition comprising a vinyl chloride polymer in which at least 50% of the monomer units are vinyl chloride monomer units, any balance being derived from an ethylenically unsaturated monomer; from 0.01 to 10 parts by weight per 100 parts by weight of said polymer of 2-hydroxy-4-methoxybenzophenone; and from 0.1 to 10 parts by weight per 100 parts by weight of said polymer of cadmium orthophosphite.

References Cited by the Examiner

UNITED STATES PATENTS

| | | | |
|---|---|---|---|
| 2,625,521 | 1/1953 | Fischer et al. | 260—45.95 |
| 2,752,319 | 6/1956 | Lipke et al. | 260—45.7 |
| 2,919,259 | 12/1959 | Naylor et al. | 260—45.95 |
| 2,951,052 | 8/1960 | Darby | 260—45.7 |

FOREIGN PATENTS 159,895   11/1954   Australia.

LEON J. BERCOVITZ, *Primary Examiner.*

DONALD E. CZAJA, *Examiner.*

H. E. TAYLOR, *Assistant Examiner.*